United States Patent
Xiang et al.

(10) Patent No.: US 10,181,364 B2
(45) Date of Patent: Jan. 15, 2019

(54) HIGH RELIABILITY POWER CABLES FOR SUBSEA APPLICATION

(71) Applicant: SCHLUMBERGER TECHNOLOGY CORPORATION, Sugar Land, TX (US)

(72) Inventors: Jinglei Xiang, Lawrence, KS (US); Jason Holzmueller, Lawrence, KS (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/323,695

(22) PCT Filed: Jun. 19, 2015

(86) PCT No.: PCT/US2015/036722
§ 371 (c)(1),
(2) Date: Jan. 3, 2017

(87) PCT Pub. No.: WO2016/003675
PCT Pub. Date: Jan. 7, 2016

(65) Prior Publication Data
US 2017/0162296 A1 Jun. 8, 2017

Related U.S. Application Data

(60) Provisional application No. 62/020,888, filed on Jul. 3, 2014.

(51) Int. Cl.
*H01B 7/00* (2006.01)
*H01B 7/02* (2006.01)
(Continued)

(52) U.S. Cl.
CPC .......... *H01B 7/0216* (2013.01); *C09J 127/12* (2013.01); *H01B 7/14* (2013.01);
(Continued)

(58) Field of Classification Search
CPC .......... H01B 7/10; H01B 7/0216; H01B 7/14; H01B 7/18; H01B 9/006; H01B 13/141; H01B 13/145; H01B 13/148
(Continued)

(56) References Cited

U.S. PATENT DOCUMENTS 5,106,673 A * 4/1992 Effenberger ............ B32B 27/08
428/216
5,426,264 A * 6/1995 Livingston ............. H01B 7/046
174/102 R
(Continued)

FOREIGN PATENT DOCUMENTS

JP 5296462 * 9/2008 ............... H01B 7/18
JP 2010062068 A 3/2010

OTHER PUBLICATIONS

Search Report and Written Opinion of International Patent Application No. PCT/US2015/036722 dated Oct. 19, 2015, 11 pages.
(Continued)

*Primary Examiner* — William H Mayo, III

(57) ABSTRACT

A power cable for an electric submersible pump (ESP) includes an electrical conductor in the power cable; an elastomeric insulation layer around the electrical conductor; a fluoroplastic barrier layer around the elastomeric insulation layer; and a bonding layer between the elastomeric insulation layer and the fluoroplastic barrier layer, the bonding layer formulated to prevent a dielectric breakdown of the power cable and a rapid gas decompression breakdown of the power cable.

19 Claims, 5 Drawing Sheets

(51) Int. Cl.
*H01B 7/14* (2006.01)
*H01B 13/14* (2006.01)
*C09J 127/12* (2006.01)

(52) U.S. Cl.
CPC ......... *H01B 13/141* (2013.01); *H01B 13/145* (2013.01); *H01B 13/148* (2013.01)

(58) Field of Classification Search
USPC ....... 174/102 R, 102 SC, 105 R, 107, 110 R, 174/113 R, 120 R, 120 SC, 120 AR
See application file for complete search history.

(56) References Cited

U.S. PATENT DOCUMENTS

| | | | |
|---|---|---|---|
| 5,626,930 A | 5/1997 | Fukushi | |
| 6,117,508 A * | 9/2000 | Parsonage | B32B 1/08 |
| | | | 428/36.91 |
| 6,197,393 B1 * | 3/2001 | Jing | B32B 27/08 |
| | | | 428/35.9 |
| 7,989,700 B2 | 8/2011 | Eshima | |
| 8,204,348 B2 | 6/2012 | Keller et al. | |
| 2003/0113464 A1 * | 6/2003 | Fukushi | B05D 1/265 |
| | | | 427/407.1 |
| 2006/0102376 A1 * | 5/2006 | Kuchita | H01B 3/446 |
| | | | 174/102 SC |
| 2007/0190284 A1 * | 8/2007 | Park | B32B 7/12 |
| | | | 428/66.4 |
| 2010/0163271 A1 * | 7/2010 | Holzmueller | C08L 19/006 |
| | | | 174/110 R |
| 2010/0186990 A1 * | 7/2010 | Neuroth | H01B 7/045 |
| | | | 174/120 AR |
| 2011/0067799 A1 * | 3/2011 | Mussig | A61L 15/58 |
| | | | 156/94 |
| 2013/0153260 A1 * | 6/2013 | Favereau | H01B 7/18 |
| | | | 174/102 C |
| 2013/0306348 A1 * | 11/2013 | Holzmueller | H01B 9/02 |
| | | | 174/105 R |
| 2014/0027152 A1 * | 1/2014 | Holzmueller | H01B 3/445 |
| | | | 174/113 R |

OTHER PUBLICATIONS

International Preliminary Report on Patentability of International Patent Application No. PCT/US2015/036722 dated Jan. 12, 2017, 10 pages.

* cited by examiner

HIGH RELIABILITY POWER CABLES FOR SUBSEA APPLICATION

RELATED APPLICATIONS

This patent application is a 371 National Stage of International Application No. PCT/US2015/036722, filed Jun. 19, 2015, which claims the benefit of priority to U.S. Provisional Patent Application No. 62/020,888 to Xiang et al., filed Jul. 3, 2014 and incorporated by reference herein in its entirety.

BACKGROUND

Electric submersible pump (ESP) power cables and motor lead extensions (MLE) incorporate high integrity insulation and armor. Conventional cables may rely on lead layers to resist high temperatures and pressures, and corrosives in the well fluid. While the lead sheaths provide excellent barrier properties, the regulation of lead metal and its use can results in leaded cables with reduced reliability and lower lifespan.

In conventional cable-making, lead metal is extruded onto the insulation in its own separate extrusion process. The insulation, however, has already been post-cured and does not bond very significantly with the molten lead. Due to this lack of interfacial bonding and a difference in the coefficient of thermal expansion between these materials, gas-filled micro-voids and impurities carried over from previous post-curing processes are introduced between the conventional insulation layer and the conventional lead sheath.

The dielectric constant within the unintended micro-voids and gaps is less than that of the surrounding dielectric, allowing the possibility of partial discharges—localized dielectric breakdowns of the insulation.

Gas-filled micro-voids or packets between the insulation and the conventional lead barrier may also cause barrier layer damage, such as lead barrier rupture during conditions when the cable is rapidly being depressurized or undergoing cyclic pressurization.

SUMMARY

High reliability power cables for subsea application are provided. In an implementation, a power cable for an electric submersible pump (ESP), comprises an electrical conductor in the power cable, an elastomeric insulation layer around the electrical conductor, a fluoroplastic barrier layer around the elastomeric insulation layer, and a bonding layer between the elastomeric insulation layer and the fluoroplastic barrier layer, the bonding layer formulated to prevent a dielectric breakdown of the power cable and a rapid gas decompression breakdown of the power cable. An example method includes extruding an elastomeric insulation layer onto one or more components of a power cable for an electric submersible pump (ESP), including at least a conductor, creating an adhesive surface layer on the elastomeric insulation layer, and extruding a fluoroplastic barrier layer onto the adhesive surface to molecularly cross-link with the elastomeric insulation layer. Another example method includes extruding an elastomeric insulation layer comprising a fluoroplastic-compatible modified EPDM rubber onto one or more components of a power cable for an electric submersible pump (ESP), including at least a conductor, then preserving the fluoroplastic-compatible modified EPDM rubber from an ambient environment, extruding a fluoroplastic barrier layer onto the fluoroplastic-compatible modified EPDM rubber, and creating an interface bonding surface between the fluoroplastic-compatible modified EPDM rubber of the elastomeric insulation layer and the fluoroplastic barrier surface.

This summary is not intended to identify key or essential features of the claimed subject matter, nor is it intended to be used as an aid in limiting the scope of the claimed subject matter.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

This disclosure describes high reliability power cables for subsea applications. Since subsea applications provide one of the most challenging environments for cables, the high reliability power cables described herein may also be used for most other applications.

In an implementation, the pitfalls of a conventional lead sheath extruded onto an insulation layer in an ESP power cable are overcome with a tough fluoroplastic barrier layer made to bond well with the insulation layer. "Barrier," as used herein, means that the layer resists an aggressive environment that may expose the power cable to wear, to high temperatures and pressures, and also means that the layer is relatively impermeable to, and inert against, hot and pressurized corrosives in the well fluid, such as dissolved carbon dioxide $CO_2$, methane $CH_4$, and hydrogen sulfide $H_2S$. The fluoroplastic barrier layer and its methods of construction provide several advantages. First, the environmental and regulatory issues that accompany using lead metal are avoided. Second, the bonding interface between underlying elastomeric insulation and the fluoroplastic barrier is superior to that of conventional lead metal extruded onto the insulation layer. This stronger interfacial bonding between the insulation layer and the overlying fluoroplastic barrier, as described herein, prevents formation of unwanted micro-voids and air gaps. These voids and gaps between layers can allow "partial discharge" (PD) dielectric breakdown at high voltage. Third, the superior bonding interface that avoids the micro-voids and gaps between the insulation layer and the overlying fluoroplastic barrier also eliminates the possibility of the voids trapping gases, which can expand during rapid decompression to damage the power cable.

Example Implementations

Figure 1:
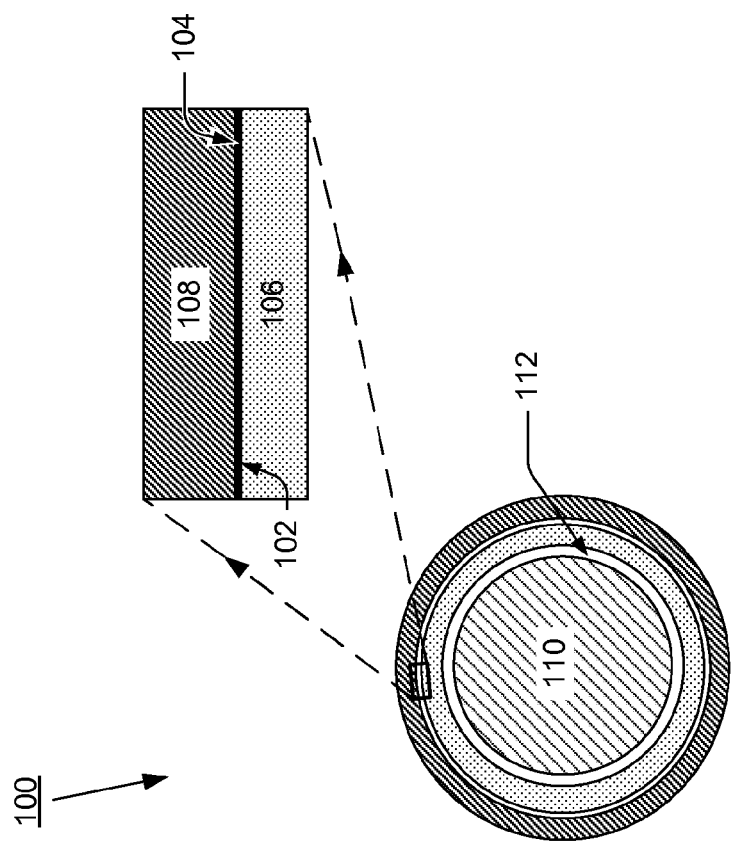
FIG. 1 is a diagram of example layers of an example power cable with improved interfacial bonding.
Figure 1:
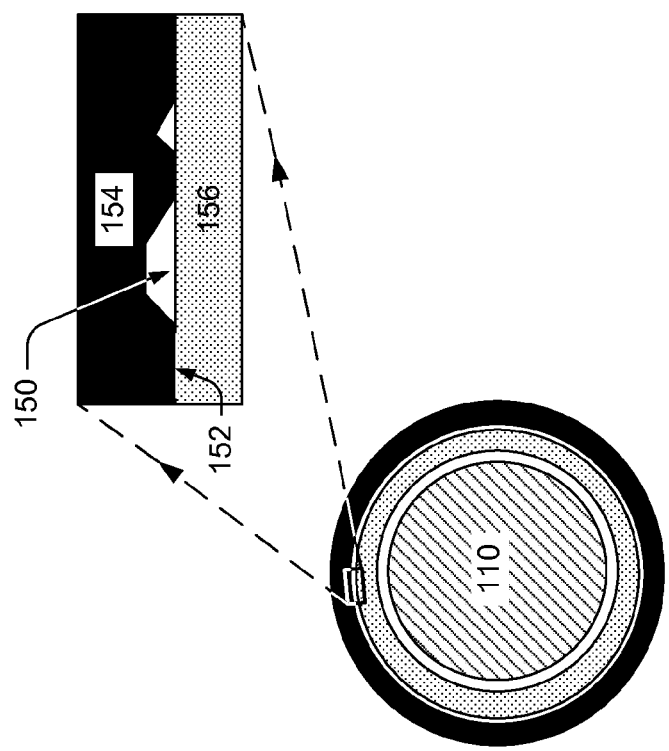

FIG. 1 shows an example power cable 100 with an improved bonding interface 102 formed between a fluoroplastic primer-adhesive layer 104 and an insulation layer 106. The improved bonding interface 102 is shown in comparison with conventional micro-voids 150 formed at the interface 152 between a conventional lead barrier layer 154 and a conventional insulation layer 156. The example fluoroplastic primer-adhesive layer 104 ("adhesive layer" 104) described herein, in turn, bonds well with an example fluoroplastic barrier 108 overlying the adhesive layer 104.

The term "power cable" 100, as used herein, also includes motor lead extensions (MLEs) and includes power cables 100 with one or more solid or braided conductors. For clarity, the explanation of layers focuses on layers around a single conductor, used as an example.

The example power cable 100 may include the following layer components: a conductor 110, such as copper with a corrosion-resistant coating 112; the insulation layer 106, such as polypropylene, EPR, EPDM, polyimide, or PEEK; the bonding interface 102, such as the fluoroplastic primer-adhesive layer 104; and the fluoroplastic barrier layer 108. The insulation layer 106 may be cured EPDM rubber (ethylene propylene diene monomer), a synthetic elastomeric rubber.

In some implementations, a jacket layer (not shown), such as EPR & EPDM, nitrile, fluoroplastic, etc., is extruded over the fluoroplastic barrier layer 108. In turn, an armor layer (not shown), such as galvanized steel, a Monel alloy, an Inconel alloy, and so forth, may be further extruded or otherwise formed over the jacket layer. In an implementation, the example fluoroplastic barrier layer 108 described herein also takes the place of the jacket layer. In an implementation, the example fluoroplastic barrier 108 described herein takes the place of both the jacket layer and/or the armor layer, so that no lead metal whatsoever is used in the example power cable 100.

As mentioned above, conventional methods for extruding lead metal onto elastomeric insulation have the vulnerability of a lack of interfacial bonding between the lead metal and the elastomeric insulation, made worse by a difference in their coefficients of thermal expansion. This scenario allows gas-filled voids and micro-defects to form between the conventional insulation layer and the conventional lead barrier sheath.

Since the dielectric constant of these unintended voids is considerably less than that of the surrounding dielectric, the electric field across the voids is significantly higher than that across an equivalent distance of the dielectric. If the voltage stress across the void is increased above a corona inception voltage for the gas trapped within the void, partial discharge (PD) electrical activity begins to occur. Partial discharge (PD) is a localized dielectric breakdown of a small portion of a solid (or fluid) electrical insulation system under high voltage stress, but which does not bridge the entire space or distance between two adjacent conductors.

In a similar manner, micro-voids containing gases introduced during extrusion may be one of the leading causes for the partial discharge (PD) phenomenon. The resistance of the power cable to rapid gas decompression may be compromised by the existence of such gas micro-voids or gas packets located at the interface between insulation and barrier. The accumulation of gases at these imperfect interfaces leads to barrier layer damage, such as lead barrier ruptures during conditions in which the system is rapidly depressurized or undergoing cyclic pressurization. The improved bonding interface 102 of the example power cable 100 can prevent these vulnerabilities.

Figure 2:
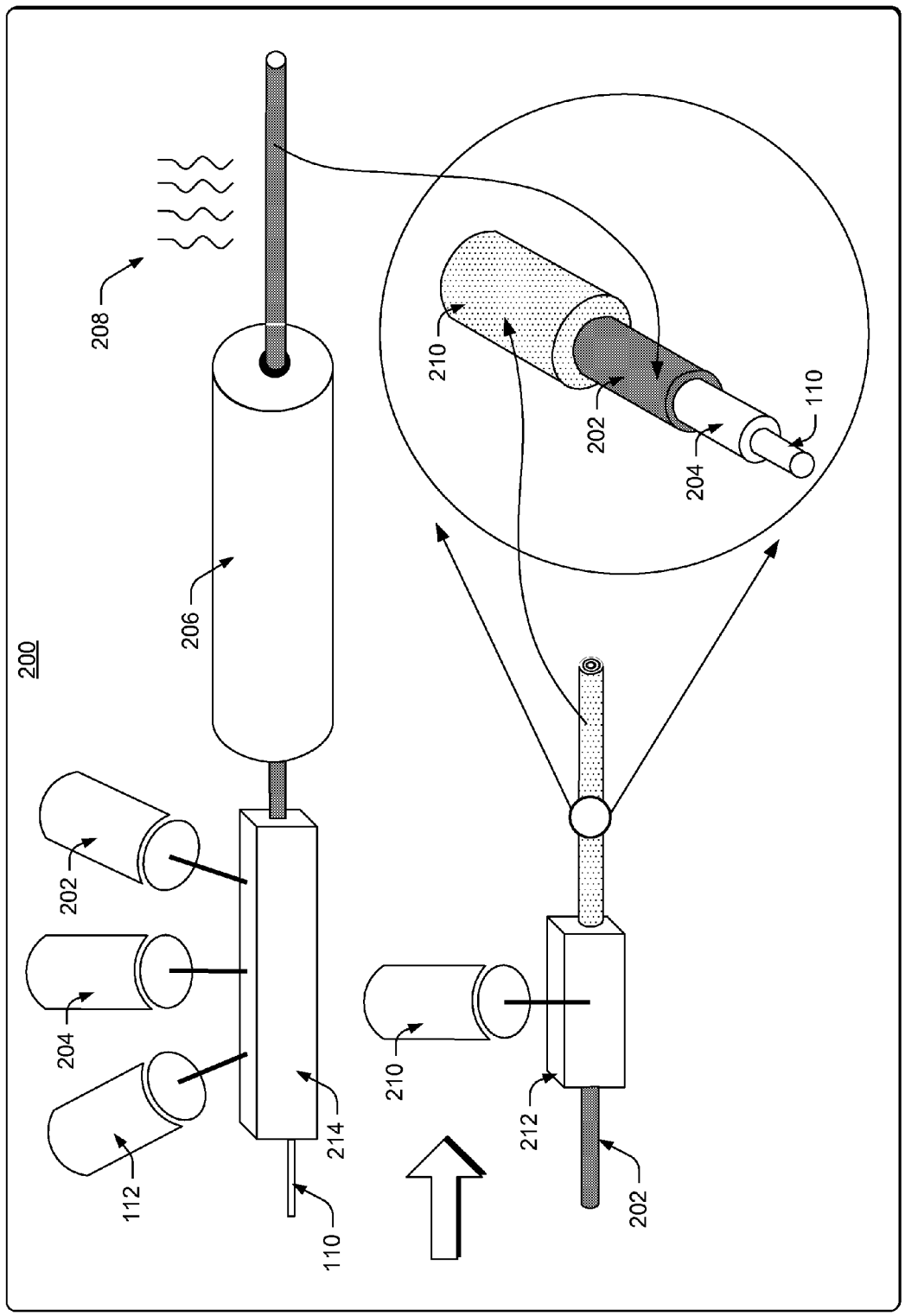
FIG. 2 is a diagram of an example triple extrusion process for making a power cable with improved interfacial bonding using a fluoroplastic compatible elastomeric insulation layer.

FIG. 2 shows an example triple extrusion process 200 that can be applied in two passes, for example. In the second pass, a primer layer 202 may be preheated by blowing hot air, dry nitrogen, etc., followed by extruding another thicker fluoroplastic barrier layer 210 as the effective impermeable layer on top of this primer layer 202. The primer layer 202 can be a thin fluoroplastic layer that does not interfere with outgassing of cure byproducts of an EPDM insulation layer 204 underneath it during post-curing.

The example triple extrusion process 200 includes applying the primer layer 202 after application of the insulation layer 204 to a conductor 110, such as a tie layer coated conductor 110. Extrusion of the primer layer 202 is followed by a curing process, for example in a steam tube 206, and a post-curing process 208. Then, the fluoroplastic barrier layer 210 is applied at a separate cross head 212. The triple extrusion process 200 can be implemented by co-extrusion cross heads 214, or by separate tandem extrusion steps (not shown).

In an implementation, in order to reduce the effect of surface imperfection introduced during a single pass extrusion process, the interface between insulation 204 and barrier layers 210 is protected from (not exposed to) the ambient environment, before barrier layer 210 extrusion. The enhanced extrusion process 200 utilizes triple extrusion or tandem extrusion and minimizes interfacial contamination of the insulation-barrier interface.

In an implementation, the example power cable 100 includes an electrical conductor 110, an elastomeric insulation layer 204 around the electrical conductor 110, a fluoroplastic barrier layer 210 around the elastomeric insulation layer 204, and a bonding layer 202 between the elastomeric insulation layer 204 and the fluoroplastic barrier layer 210. The bonding layer 202 is formulated to prevent a dielectric breakdown of the power cable 100 and rapid gas decompression breakdown of the power cable 100.

The elastomeric insulation layer 204 may be a cured ethylene propylene diene monomer (EPDM) rubber. For example, the elastomeric insulation layer 204 may be a fluoroplastic-compatible modified EPDM rubber. The bonding layer 202 may be a fluoroplastic primer-adhesive 202 between the fluoroplastic-compatible modified EPDM rubber 204 and the fluoroplastic barrier layer 210.

The bonding layer 202 may include an agent for stripping fluorine atoms from the face of the fluoroplastic barrier layer 210. When the fluoroplastic barrier layer 210 is extruded to encapsulate the fluoroplastic-compatible modified EPDM rubber 204, the agent strips fluorine atoms from the face of the fluoroplastic barrier layer 210 to allow cross-linking bonds to form with the fluoroplastic-compatible modified EPDM rubber 204. The agent may be a metal oxide and a dehydrohalogenating chemical, such as an onium compound, an organo-onium, an amidine, DBU, or DBN. Chemically, DBN is 1,5-Diazabicyclo[4.3.0]non-5-ene, with the compound formula $C_7H_{12}N_2$. DBN is an amidine base. Chemically, DBU is 1,8-diazabicyclo[5.4.0]undec-7-ene.

The fluoroplastic barrier layer 210 may be one of the following: a polyvinylidene fluoride fluoroplastic, a polyvinylidene difluoride (PVDF) fluoroplastic, a polyvinyl fluoride (PVF), an ethylene tetrafluoroethylene (ETFE), or a chlorotrifluoroethylene (CTFE). Alternatively the barrier layer 210 may be selected from the polyaryletherketone family such as a polyetherketone (PEK), a polyether ether ketone (PEEK), or a polyetherketone-etherketoneketone (PEKEKK), etc.

In an implementation, the bonding layer 202, which is the primer or primer-adhesive 202 applied to the fluoroplastic-compatible modified EPDM rubber insulation layer 204, can be a synthetic rubber fluoropolymer elastomer, a terpolymer of tetrafluoroethylene (TFE) and vinylidene fluoride (VF2) and hexafluoropropylene (HFP), such as VITON (DuPont Performance Elastomers LLC, Wilmington, Del.), or a fluorothermoplastic of tetrafluoroethylene, hexafluoropropylene and vinylidene fluoride, such as DYNEON THV 500 GZ (3M Company, St. Paul, Minn.). A reactive PVDF or fluoropolymer, such as THV (the above fluoroplastic consisting of tetrafluoroethylene, hexafluoropropylene, and vinylidene fluoride), has excellent chemical and permeation resistance and low flammability and can be formulated into a hydrocarbon elastomer insulation compound such as EPDM/EPR which later reacts and bonds to the fluoropolymer barrier layer 210 applied next (EPR contains only the ethylene and propylene monomers, whereas EPDM also contains a diene monomer).

The fluoroplastic barrier layer 210 may include a blocking agent to increase the impermeability of the fluoroplastic barrier layer 210, such as clay, carbon black, graphene, graphite, talc, mica, silica, or metal particles/nanoparticles, and so forth.

In an implementation, the fluoroplastic barrier layer 210 may also assume the role of a jacket layer in the power cable 100 or an outer armor layer of the power cable 100.

Figure 3:
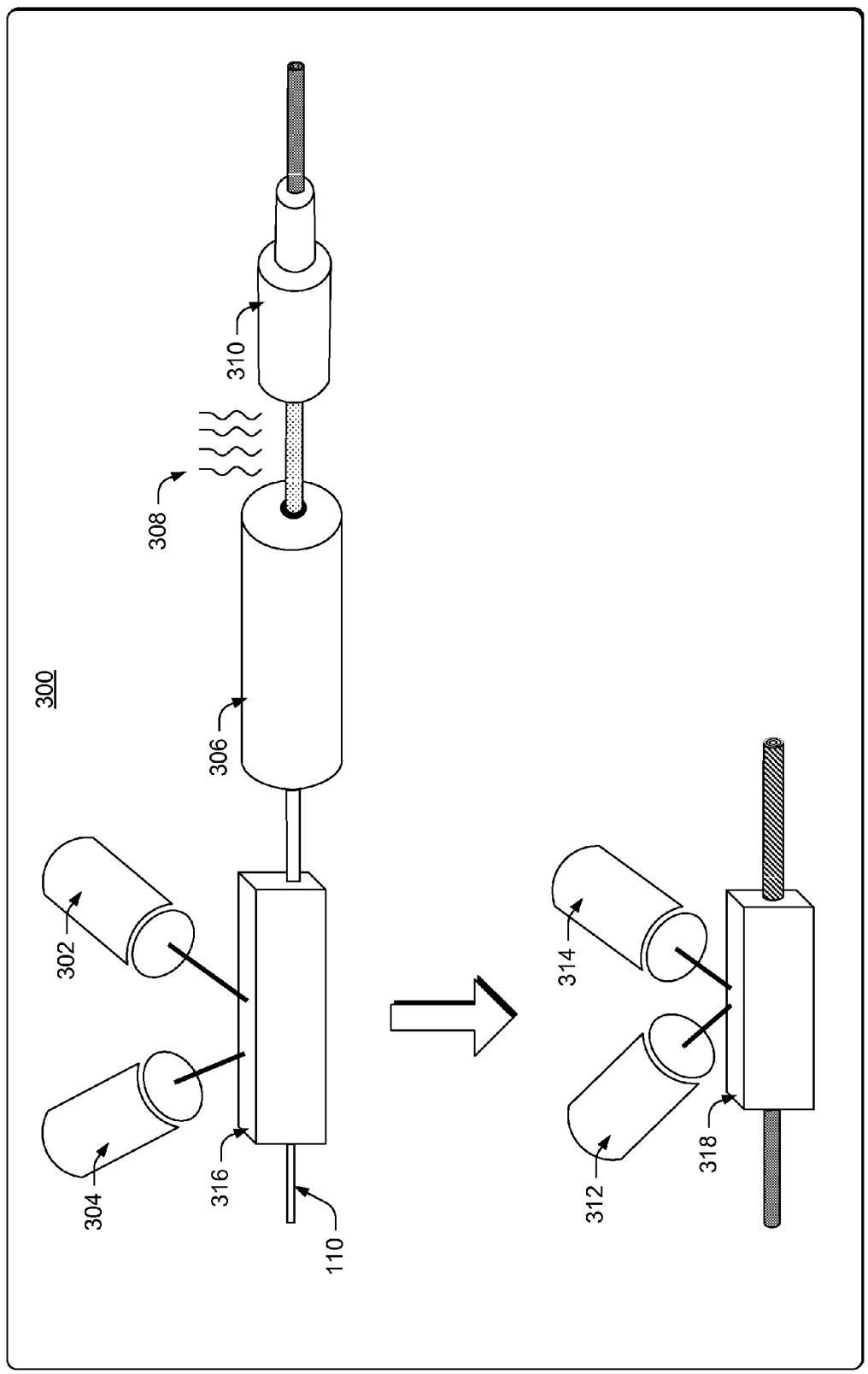
FIG. 3 is a diagram of an example extrusion process for making a power cable with improved interfacial bonding using a conventional elastomeric insulation layer.

FIG. 3 shows an example tandem co-extrusion process 300 using an insulation layer 302 that may be a conventional EPDM rubber, for example, over a tie layer 304 on the conductor 110. The example co-extrusion process 300 is followed by curing, e.g., via a steam tube 306, and post-curing 308, which is then followed in turn by a surface activation 310 of the insulation layer 302 via plasma activation or electron beam activation, for example. The activated EPDM insulation layer 302 may then undergo co-extrusion with an adhesive 312 and the impermeable fluoroplastic barrier layer 314. The co-extrusion steps can be performed via respective co-extrusion cross heads 316 & 318, or in separate tandem extrusion processes.

The plasma activation may be weakly ionized oxygen plasma, for example, to activate the surface of the insulation layer 302. The adhesive fluoroplastic layer 312, such as one of the PFA adhesives, can be coextruded with the impermeable fluoroplastic barrier layer 314, with or without a blocking agent such as graphene nanoparticles, for example, as a filler to further increase the tortuosity of the permeation path for gases and liquids.

Example Methods

Figure 4:
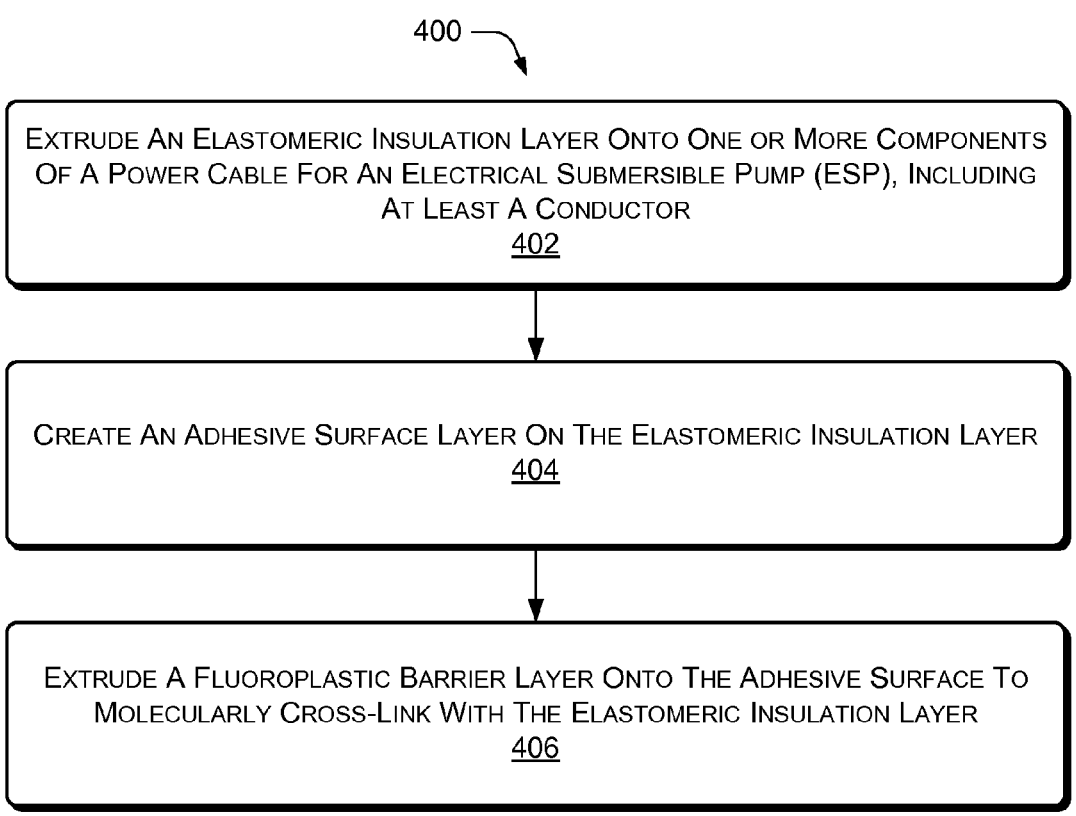
FIG. 4 is a flow diagram of an example method of making a power cable with improved interfacial bonding using a conventional elastomeric insulation layer.

FIG. 4 is a flow diagram of an example method 400 of making an ESP power cable. Operations of the example method 400 are shown as individual blocks.

At block 402, an elastomeric insulation layer is extruded onto one or more components of a power cable for an electric submersible pump (ESP), including at least a conductor.

At block 404, an adhesive surface layer is created on the elastomeric insulation layer.

At block 406, a fluoroplastic barrier layer is extruded onto the adhesive surface to molecularly cross-link with the elastomeric insulation layer.

The elastomeric insulation layer may be a cured ethylene propylene diene monomer (EPDM) rubber, and creating the adhesive surface layer may include activating a surface layer of the EPDM rubber with a plasma activation or an electron-beam activation.

Creating the adhesive surface layer on the elastomeric insulation layer may further include extruding a fluoroplastic primer or adhesive onto the elastomeric insulation layer prior to extruding the fluoroplastic barrier layer.

The method 400 may use a triple extrusion process or tandem extrusion processes.

The fluoroplastic barrier layer may be one of a polyvinylidene fluoride fluoroplastic, a polyvinylidene difluoride (PVDF) fluoroplastic, a polyvinyl fluoride (PVF), an ethylene tetrafluoroethylene (ETFE), or a chlorotrifluoroethylene (CTFE). Alternatively the barrier layer 210 may be selected from the polyaryletherketone family such as a polyetherketone (PEK), a polyether ether ketone (PEEK), or a polyetherketone-etherketoneketone (PEKEKK), etc.

Figure 5:
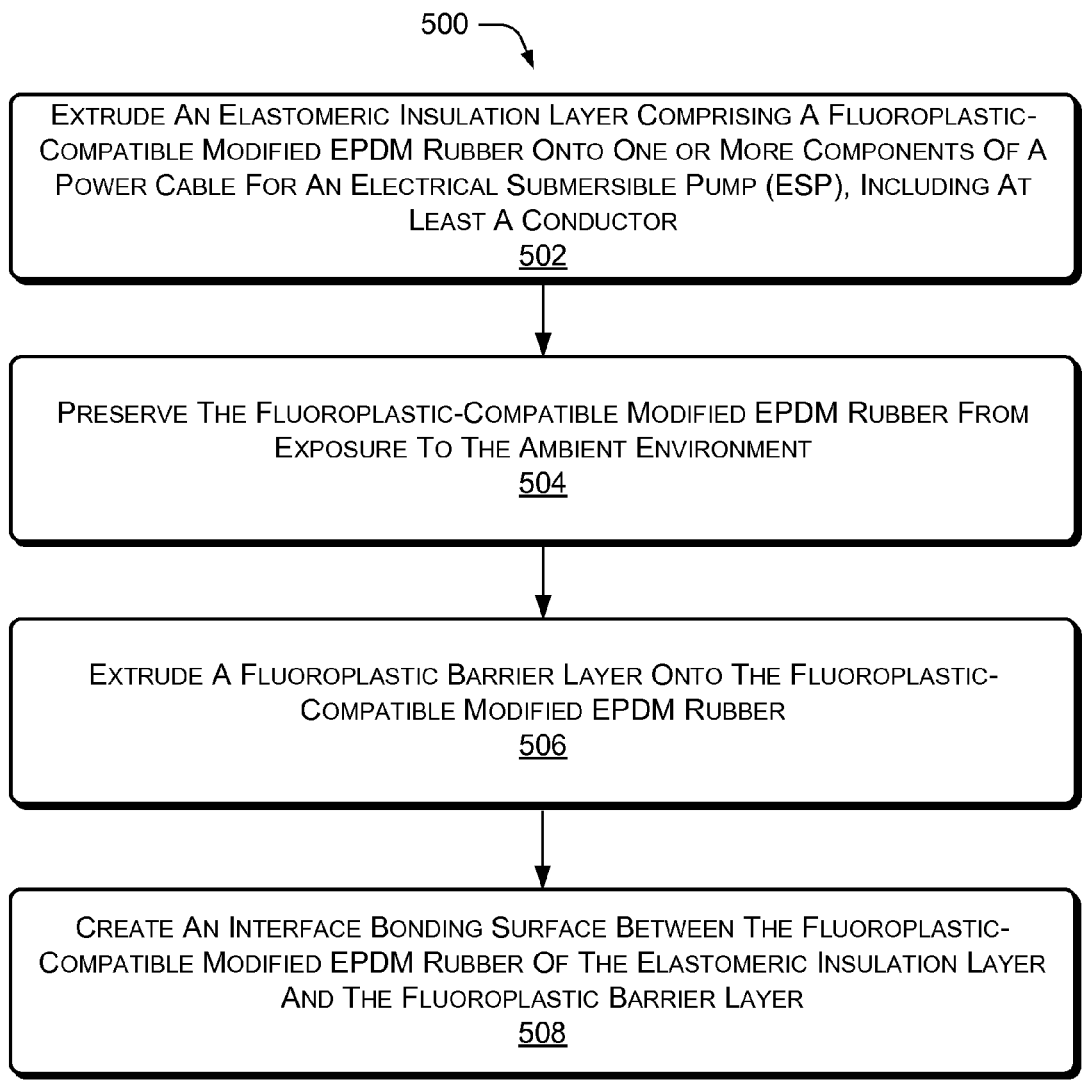
FIG. 5 is a flow diagram of an example method of making a power cable with improved interfacial bonding using a fluoroplastic compatible elastomeric insulation layer.

FIG. 5 is a flow diagram of an example method 500 of making an ESP power cable. Operations of the example method 500 are shown as individual blocks.

At block 502, an elastomeric insulation layer comprising a fluoroplastic-compatible modified EPDM rubber is extruded onto one or more components of a power cable for an electric submersible pump (ESP), including at least a conductor.

At block 504, the fluoroplastic-compatible modified EPDM rubber is preserved from an ambient environment;

At block 506, a fluoroplastic barrier layer is extruded onto the fluoroplastic-compatible modified EPDM rubber.

At block 508, an interface bonding surface is created between the fluoroplastic-compatible modified EPDM rubber of the elastomeric insulation layer and the fluoroplastic barrier surface.

The method 500 may further include applying a fluoroplastic primer-adhesive as the interface bonding surface between the fluoroplastic-compatible modified EPDM rubber and the fluoroplastic barrier layer. The fluoroplastic primer-adhesive can be selected from the following: a synthetic rubber fluoropolymer elastomer, a terpolymer of tetrafluoroethylene (TFE) and vinylidene fluoride (VF2) and hexafluoropropylene (HFP), or a fluorothermoplastic of tetrafluoroethylene, hexafluoropropylene and vinylidene fluoride.

The method 500 may further include adding an agent to the fluoroplastic primer-adhesive for stripping fluorine atoms from a face of the fluoroplastic barrier layer. When the fluoroplastic barrier layer is extruded to encapsulate the fluoroplastic-compatible modified EPDM rubber, the agent strips fluorine atoms from the face of the fluoroplastic barrier layer to allow molecular cross-linking between the fluoroplastic barrier layer and the fluoroplastic-compatible modified EPDM rubber. The agent may be a metal oxide and a dehydrohalogenating chemical, such as an onium compound, an organo-onium, an amidine, DBU, or DBN.

CONCLUSION

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

The invention claimed is:

1. A power cable for an electric submersible pump (ESP), comprising:
   an electrical conductor in the power cable;
   an elastomeric insulation layer around the electrical conductor, wherein the elastomeric insulation layer comprises a cured rubber;
   a fluoroplastic barrier layer around the elastomeric insulation layer; and
   a bonding layer between the elastomeric insulation layer and the fluoroplastic barrier layer, the bonding layer formulated to prevent a dielectric breakdown of the power cable and a rapid gas decompression breakdown of the power cable, wherein the bonding layer comprises a charged particle activated surface layer of the cured rubber.

2. The power cable of claim 1, wherein the cured rubber comprises a cured ethylene propylene diene monomer (EPDM) rubber.

3. The power cable of claim 2, wherein the charged particle activated surface layer comprises a plasma-activated surface layer of the EPDM directly bonded to the fluoroplastic barrier layer.

4. The power cable of claim 2, wherein the charged particle activated surface layer comprises an electron beam-activated surface layer of the EPDM directly bonded to the fluoroplastic barrier layer.

5. The power cable of claim 1, wherein the cured rubber comprises a fluoroplastic-compatible modified ethylene propylene diene monomer (EPDM) rubber.

6. The power cable of claim 1, wherein the fluoroplastic barrier layer is selected from the group consisting of a polyvinylidene fluoride fluoroplastic, a polyvinyl fluoride (PVF), an ethylene tetrafluoroethylene (ETFE), and a chlorotrifluoroethylene (CTFE).

7. The power cable of claim 1, wherein the fluoroplastic barrier layer includes a blocking agent to increase an impermeability of the fluoroplastic barrier layer; and
   wherein the blocking agent is selected from a group consisting of a clay, a carbon black, a graphene, a graphite, a talc, a mica, a silica, and a metal particle.

8. The power cable of claim 1, wherein the fluoroplastic barrier layer also comprises a jacket layer or an outer armor layer of the power cable.

9. A method, comprising:
   extruding an elastomeric insulation layer onto one or more components of a power cable for an electric submersible pump (ESP), including at least a conductor;
   curing at least a surface of the elastomeric insulation layer to create cured rubber;
   creating an adhesive surface layer on the elastomeric insulation layer at least by activating the cured rubber with charged particle activation; and
   extruding a barrier layer onto the adhesive surface to molecularly cross-link with the elastomeric insulation layer.

10. The method of claim 9, wherein the cured rubber comprises a cured ethylene propylene diene monomer (EPDM) rubber; and
   wherein the charged particle activation comprises a plasma activation or an electron-beam activation.

11. The method of claim 9, wherein creating the adhesive surface layer on the elastomeric insulation layer further comprises extruding a fluoroplastic primer or adhesive onto the elastomeric insulation layer prior to extruding the barrier layer.

12. The method of claim 9, further comprising a triple extrusion process or a tandem extrusion process.

13. The method of claim 9, wherein the barrier layer is selected from a group consisting of a polyvinylidene fluoride fluoroplastic, a polyvinyl fluoride (PVF), an ethylene tetrafluoroethylene (ETFE), a chlorotrifluoroethylene (CTFE), a polyaryletherketone polymer, a polyetherketone (PEK), a polyether ether ketone (PEEK), and a polyetherketoneetherketoneketone (PEKEKK).

14. A method, comprising:
   extruding an elastomeric insulation layer comprising a fluoroplastic-compatible modified EPDM rubber onto one or more components of a power cable for an electric submersible pump (ESP), including at least a conductor;
   preserving the fluoroplastic-compatible modified EPDM rubber from an ambient environment;
   extruding a fluoroplastic barrier layer onto the fluoroplastic-compatible modified EPDM rubber; and
   creating an interface bonding surface between the fluoroplastic-compatible modified EPDM rubber of the elastomeric insulation layer and the fluoroplastic barrier surface.

15. The method of claim 14, further comprising applying a fluoroplastic primer-adhesive as the interface bonding surface between the fluoroplastic-compatible modified EPDM rubber and the fluoroplastic barrier layer, the fluoroplastic primer-adhesive selected from the group consisting of a synthetic rubber fluoropolymer elastomer, a copolymer or terpolymer of tetrafluoroethylene (TFE) and vinylidene fluoride (VF2) and hexafluoropropylene (HFP), and a fluoroplastic of tetrafluoroethylene, hexafluoropropylene and vinylidene fluoride.

16. The method of claim 15, further comprising adding an agent to the fluoroplastic primer-adhesive for stripping fluorine atoms from a face of the fluoroplastic barrier layer; and
   wherein when the fluoroplastic barrier layer is extruded to encapsulate the fluoroplastic-compatible modified EPDM rubber, the agent strips fluorine atoms from the face of the fluoroplastic barrier layer to allow molecular cross-linking between the fluoroplastic barrier layer and the fluoroplastic-compatible modified EPDM rubber.

17. The method of claim 16, wherein the agent comprises a metal oxide and a dehydrohalogenating chemical selected from the group consisting of an onium compound, an organo-onium, an amidine, DBU, and DBN.

18. The method of claim 14 comprising forming the power cable for an electric submersible pump (ESP).

19. The method of claim 18 comprising transmitting power to an electric submersible pump (ESP) via the power cable.

* * * * *